US010416732B1

(12) United States Patent
Yu et al.

(10) Patent No.: US 10,416,732 B1
(45) Date of Patent: Sep. 17, 2019

(54) COVER PLATE FOR CHASSIS

(71) Applicant: HONGFUJIN PRECISION ELECTRONICS (TIANJIN) CO.,LTD., Tianjin (CN)

(72) Inventors: Mo-Ming Yu, Tianjin (CN); Jin-Liang Li, Tianjin (CN)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 16/174,215

(22) Filed: Oct. 29, 2018

(30) Foreign Application Priority Data

Jun. 27, 2018 (CN) .......................... 2018 1 0683015

(51) Int. Cl.
G11B 33/02 (2006.01)
G06F 1/18 (2006.01)
(52) U.S. Cl.
CPC ............ G06F 1/187 (2013.01); G11B 33/027 (2013.01)
(58) Field of Classification Search
None
See application file for complete search history.

(56) References Cited

U.S. PATENT DOCUMENTS

| 1,667,564 | A | * | 4/1928 | Pearson | .................. | A45C 5/005 |
| | | | | | | 206/581 |
| 1,742,821 | A | * | 1/1930 | Nichols | ................ | A47B 17/036 |
| | | | | | | 206/214 |
| 6,241,545 | B1 | * | 6/2001 | Bricaud | ............... | G06K 7/0021 |
| | | | | | | 439/326 |
| 6,296,337 | B1 | * | 10/2001 | Kawanabe | ............ | E05D 15/408 |
| | | | | | | 312/319.2 |
| 7,057,901 | B2 | * | 6/2006 | Roscoe | ................ | H05K 7/1408 |
| | | | | | | 361/679.31 |
| 2014/0007144 | A1 | * | 1/2014 | Ohnishi | .................. | G11B 25/10 |
| | | | | | | 720/647 |
| 2014/0077676 | A1 | * | 3/2014 | Lu | ......................... | G11B 33/027 |
| | | | | | | 312/326 |
| 2015/0061482 | A1 | * | 3/2015 | Yu | ......................... | H05K 5/0226 |
| | | | | | | 312/326 |
| 2015/0201522 | A1 | * | 7/2015 | Jau | ........................ | G11B 33/128 |
| | | | | | | 312/330.1 |
| 2016/0135321 | A1 | * | 5/2016 | Korikawa | ............ | H05K 5/0021 |
| | | | | | | 361/724 |
| 2017/0055360 | A1 | * | 2/2017 | Della Fiora | .......... | H05K 7/1487 |
| 2017/0150621 | A1 | * | 5/2017 | Breakstone | ......... | G06F 13/4022 |
| 2018/0182437 | A1 | * | 6/2018 | Chang | ..................... | G06F 1/187 |
| 2018/0188782 | A1 | * | 7/2018 | Lin | ......................... | G06F 1/181 |
| 2018/0275726 | A1 | * | 9/2018 | Dai | ......................... | G06F 1/182 |

* cited by examiner

*Primary Examiner* — Xanthia C Cunningham
(74) *Attorney, Agent, or Firm* — ScienBiziP, P.C.

(57) ABSTRACT

A cover plate for locking a chassis includes a first cover section provided on top of the chassis, a second cover section provided on top of the chassis and having a positioning pin, and a resilient lock defining a through hole corresponding to the positioning pin. When the resilient lock is in a first position, the positioning pin is latched in the through hole, one end of the first cover section abuts against one end of the second cover section, and the cover plate is locked. When the resilient lock is in a second position, the positioning pin is removed from the through hole, the first cover section is slid toward the second cover section, and the cover plate is unlocked.

10 Claims, 7 Drawing Sheets

COVER PLATE FOR CHASSIS

FIELD

The subject matter herein generally relates to a chassis, and more particularly to a chassis including a locking cover plate.

BACKGROUND

Generally, a chassis of an electronic device includes a cover. The cover usually includes a front section and a back section. When a hard disk drawer is installed within the chassis, the hard disk drawer may interfere with removal of the back section of the cover.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
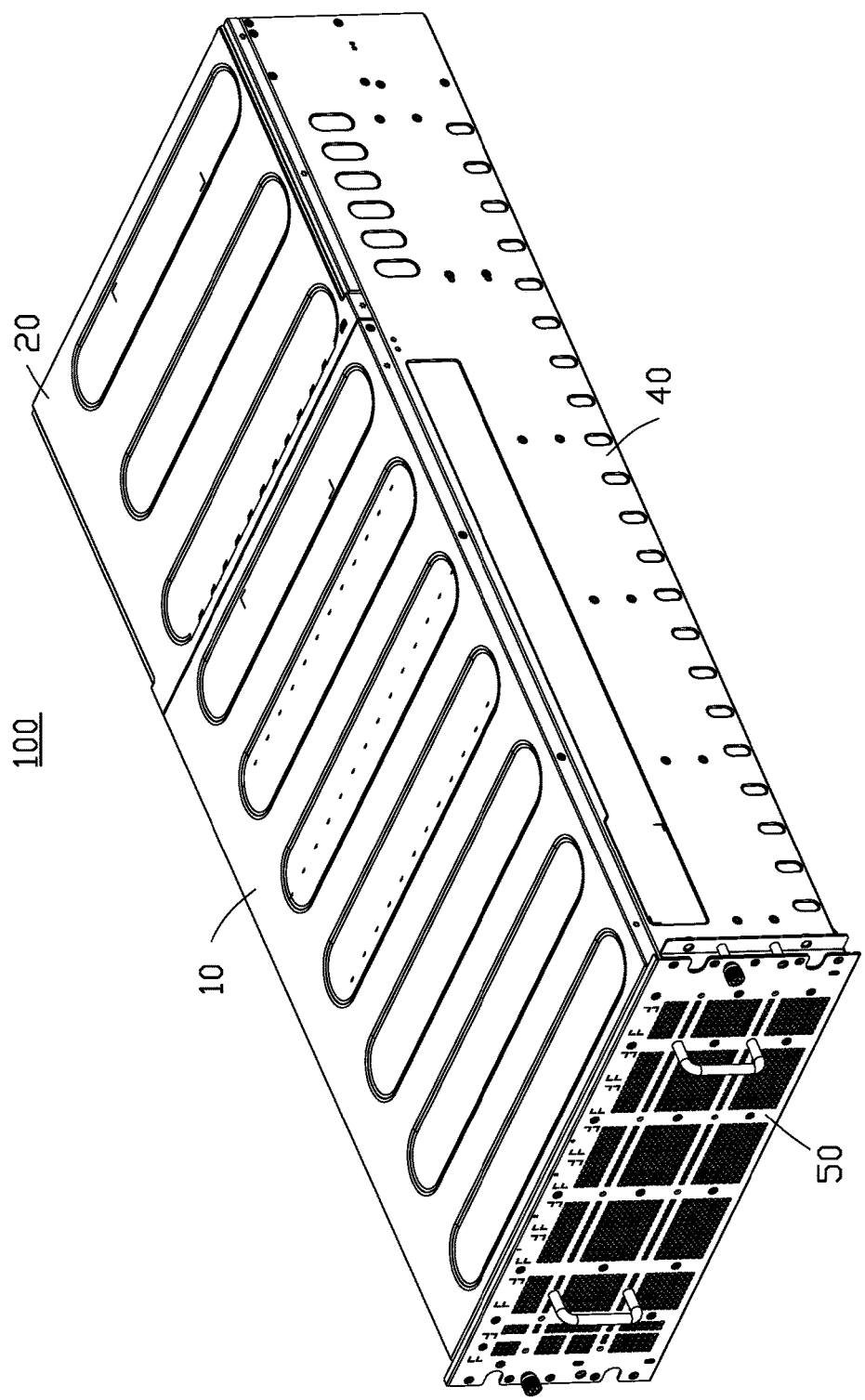
FIG. 1 is an assembled, isometric view of an embodiment of a chassis including a cover plate in accordance with the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
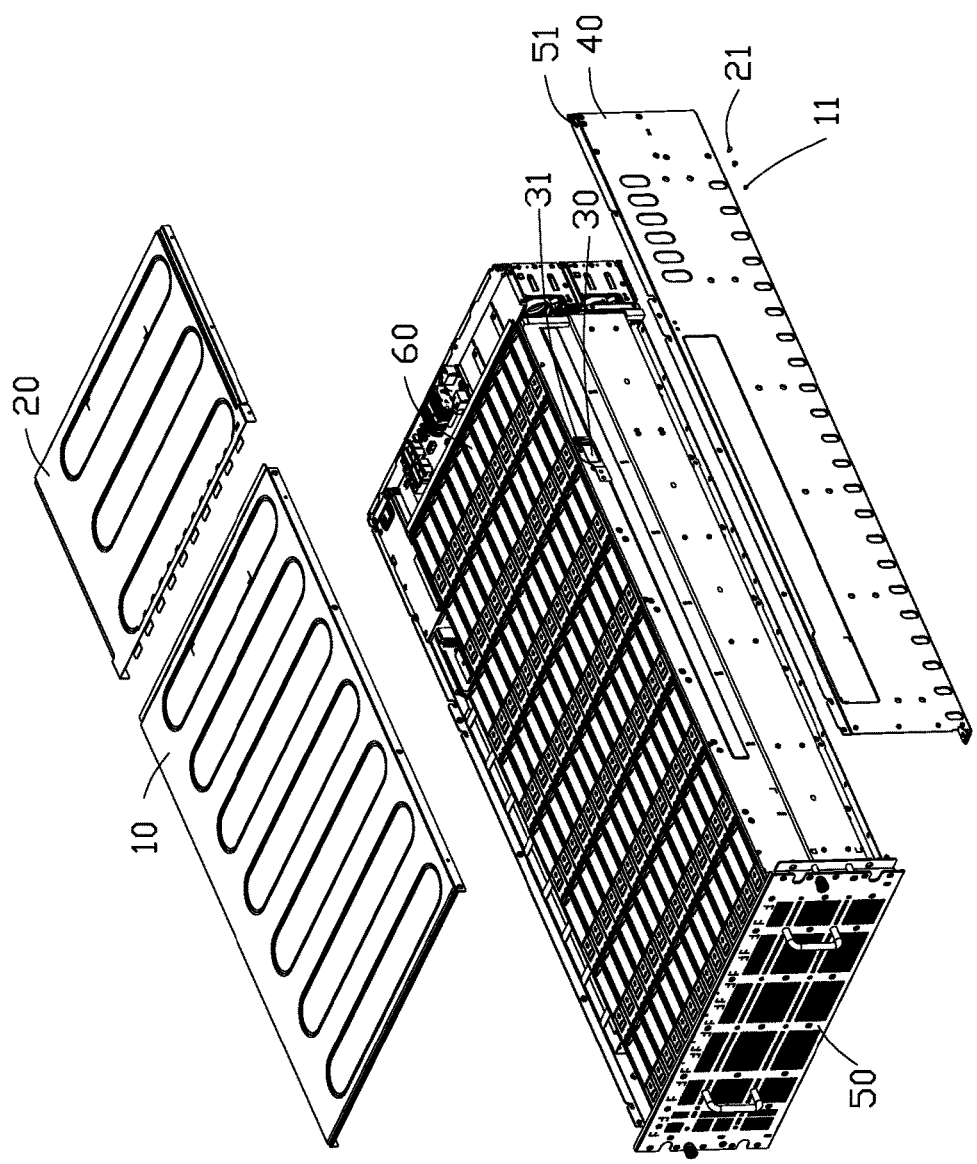
FIG. 2 is an exploded, isometric view of the chassis and the cover plate in FIG. 1.
Figure 3:
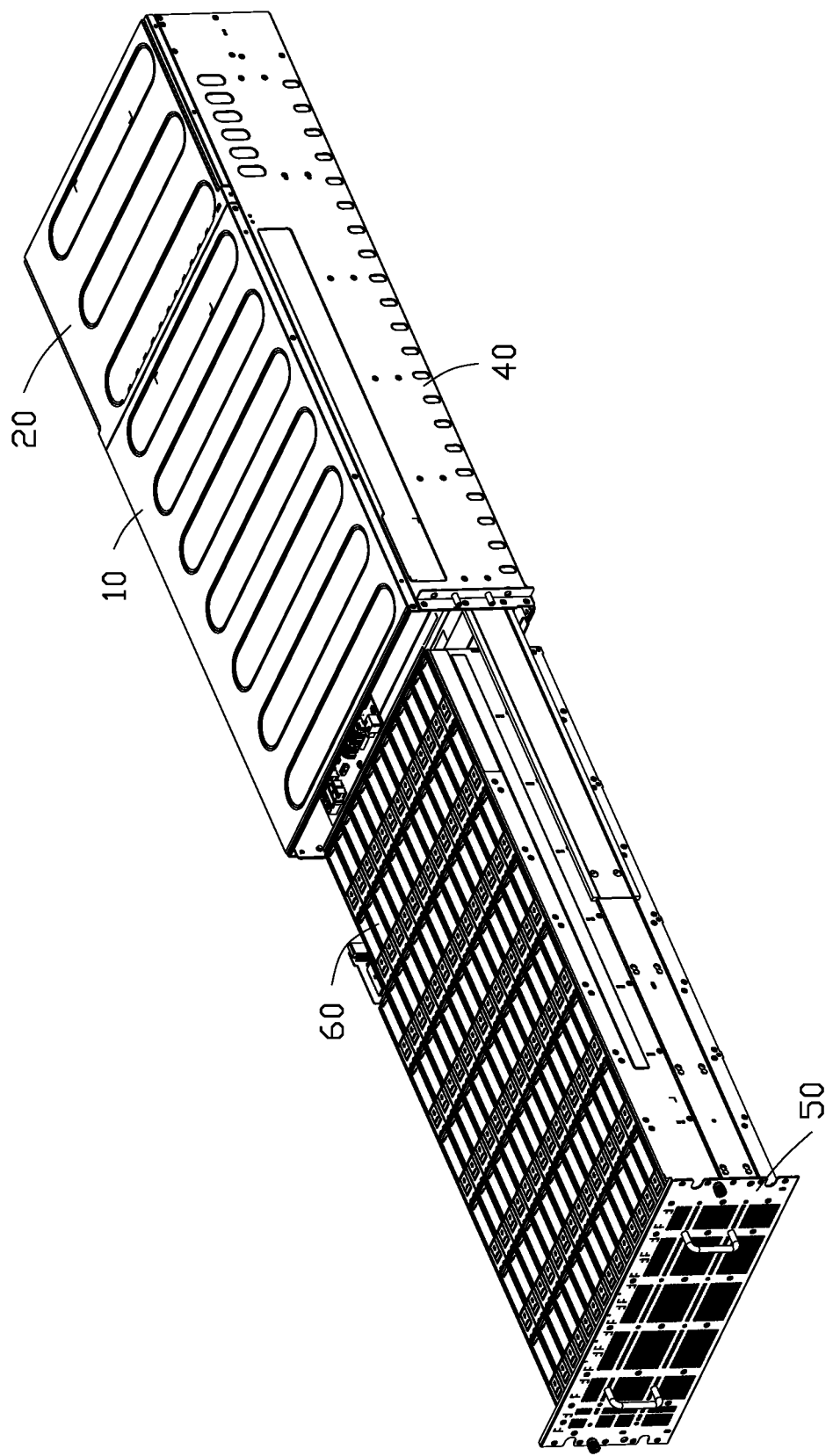
FIG. 3 is an isometric view of a hard disk drawer slid out of the chassis.
Figure 4:
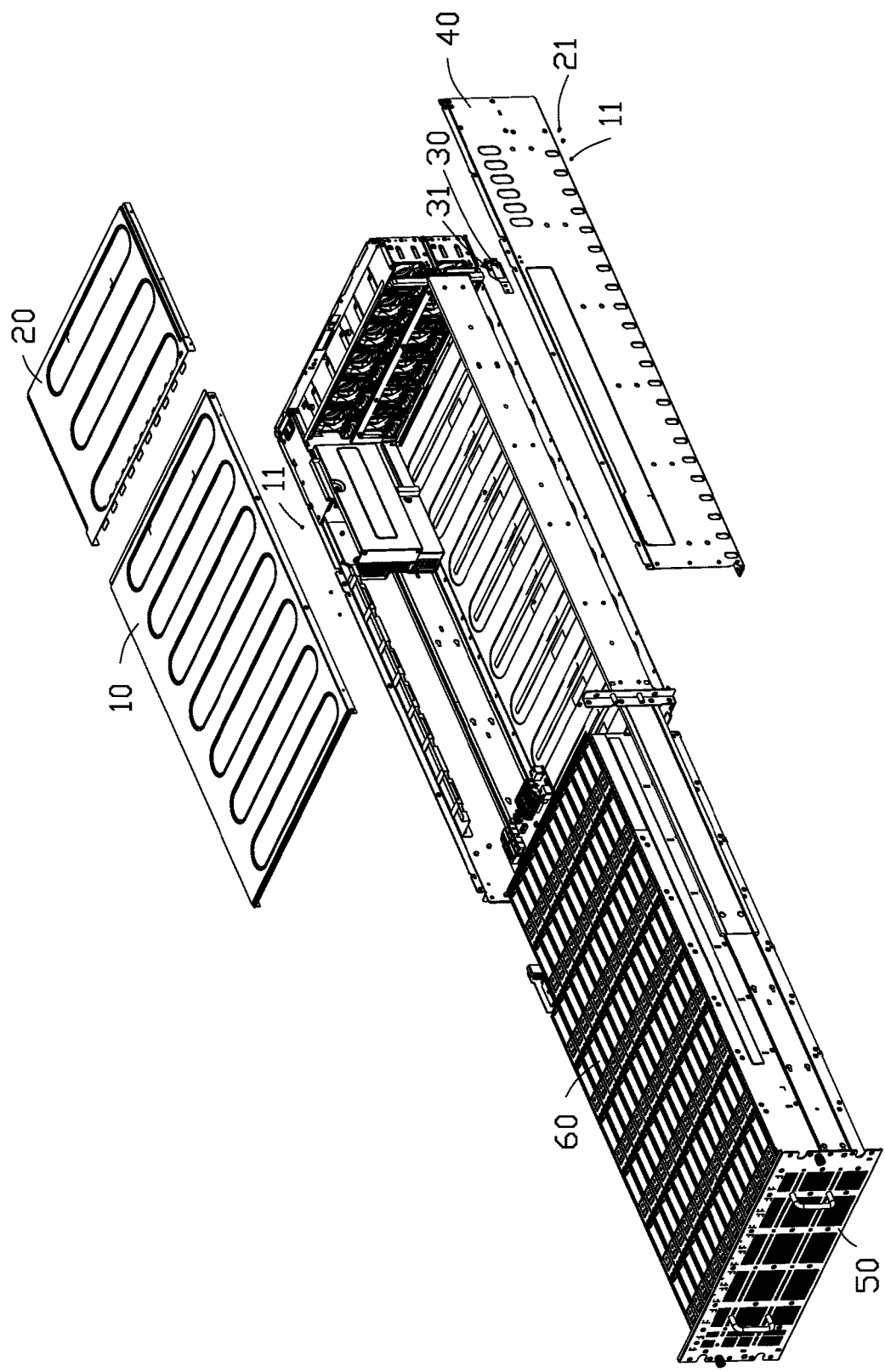
FIG. 4 is an exploded, isometric view of FIG. 3.
Figure 5:
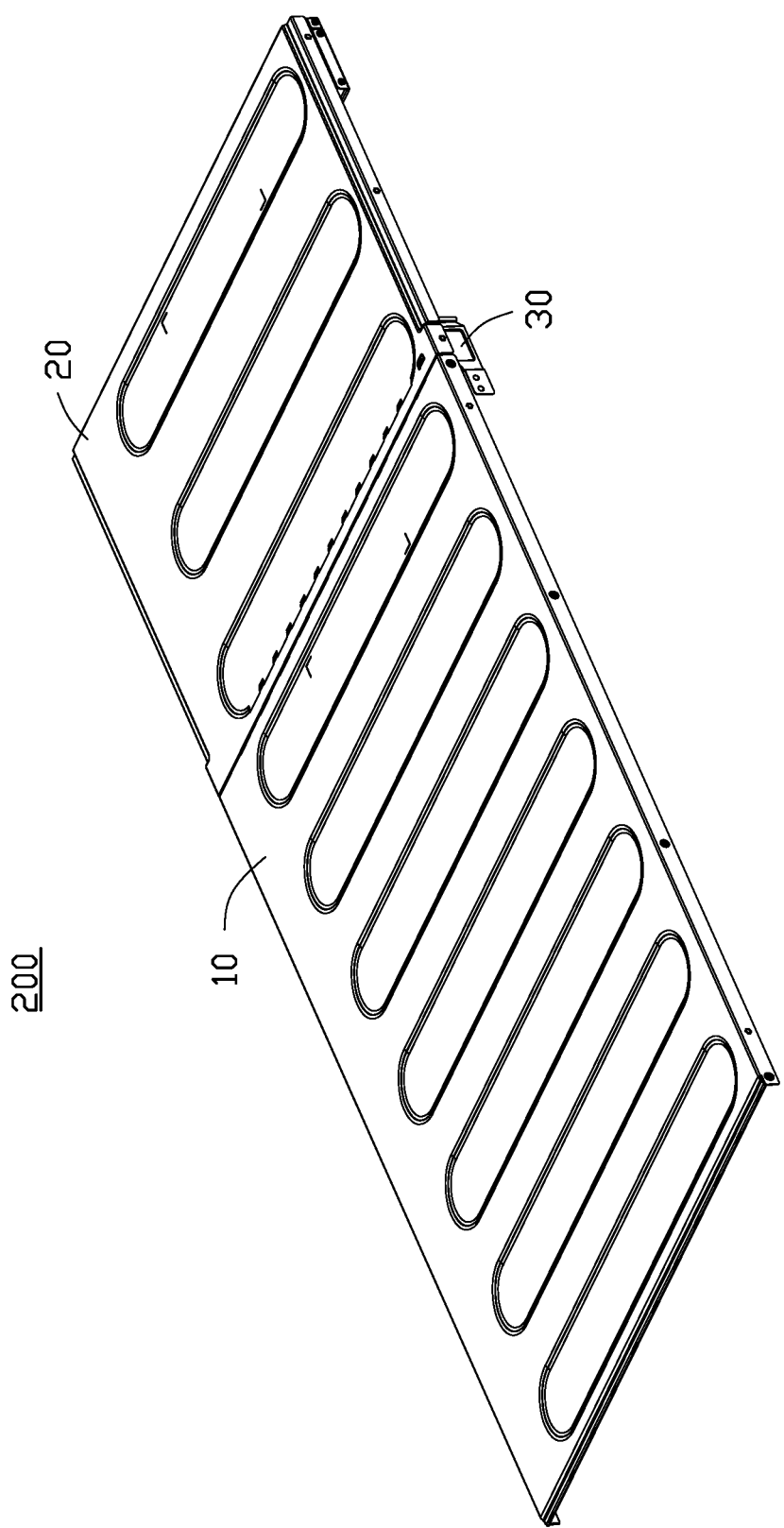
FIG. 5 is an isometric view of the cover plate of FIG. 1.
Figure 6:
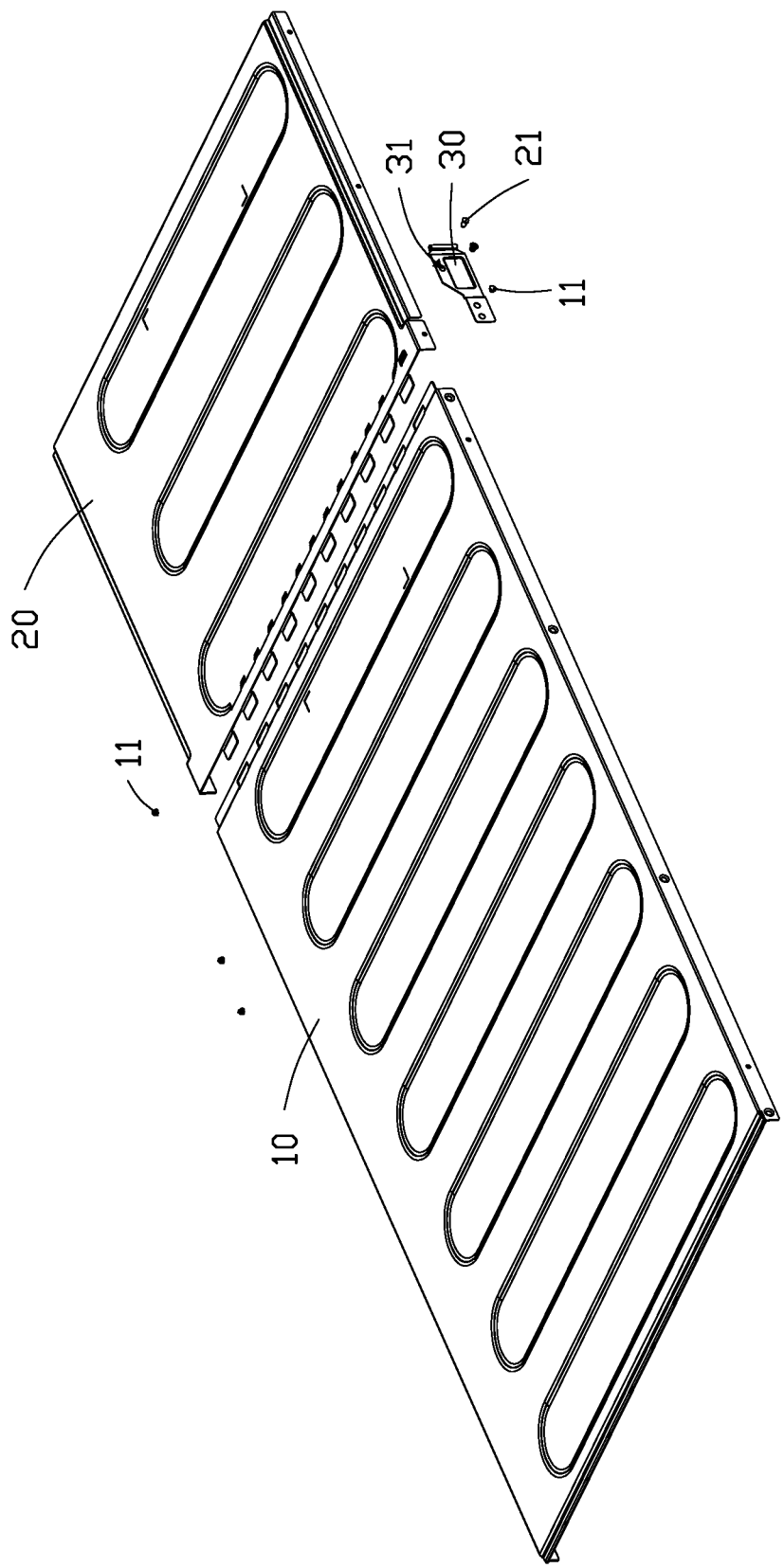
FIG. 6 is another view of the cover plate of FIG. 1.
Figure 7:
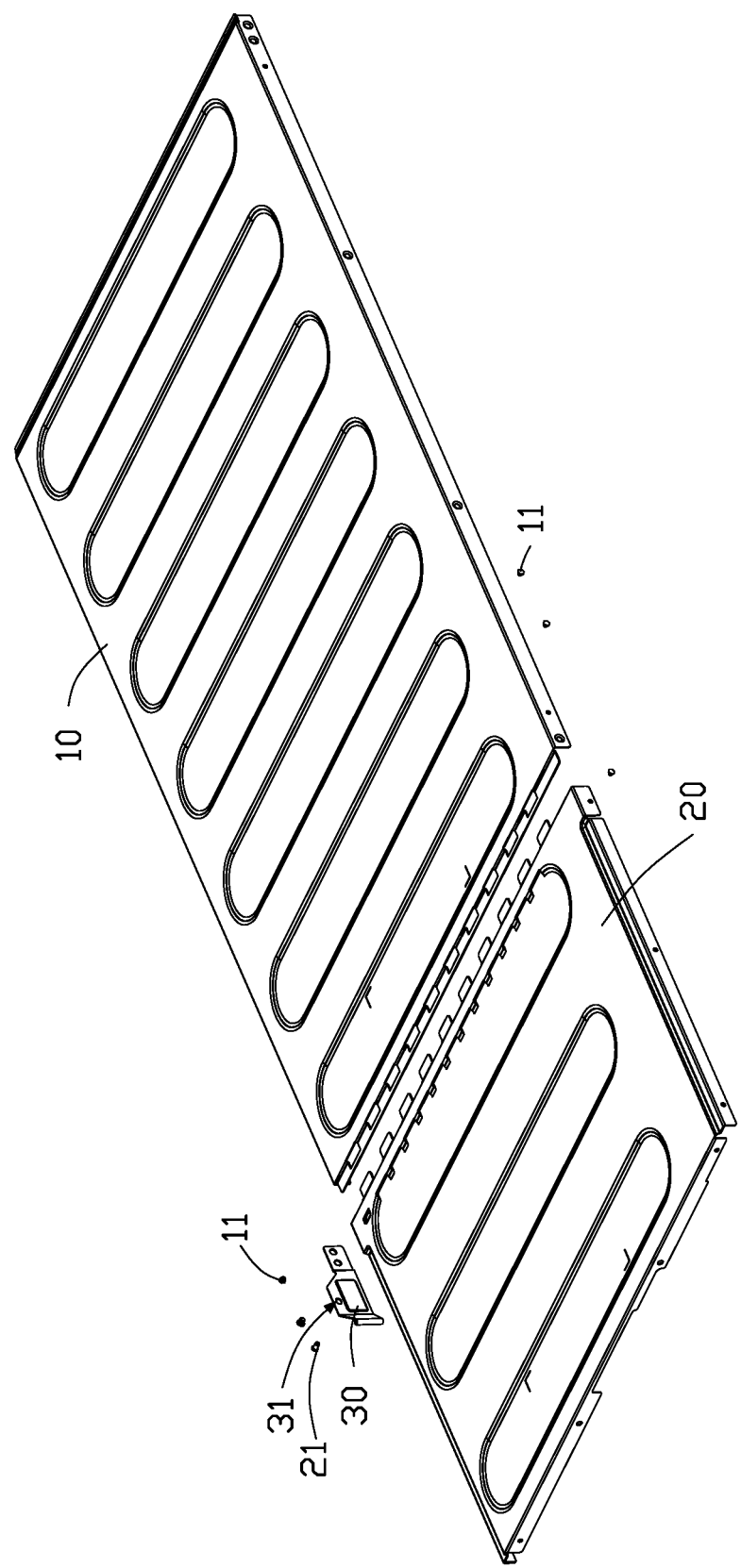
FIG. 7 is similar to FIG. 6, but shown from another angle.

FIGS. 1-7 illustrate an embodiment of a chassis 100 including a hard disk 60, a hard disk drawer 50, a side plate 40, and a cover plate 200. The hard disk 60 is fixed within the hard disk drawer 50. The hard disk drawer 50 is slidably coupled to the side plate 40. The cover plate 200 includes a first cover section 10 and a second cover section 20, in which both the first cover section 10 and the second cover section 20 are provided on top of the chassis 100. The cover plate 200 further includes a resilient lock 30. The resilient lock 30 is fixed to a side of the hard disk drawer 50. A side of the second cover section 20 includes a positioning pin 21. The resilient lock 30 defines a through hole 31 corresponding to the positioning pin 21. When the hard disk drawer 50 is slid into the side plate 40, the resilient lock 30 is resiliently deformed, the positioning pin 21 is latched within the through hole 31, one end of the first cover section 10 resists against one end of the second cover 20, and the cover plate 200 is locked. When the hard disk drawer 50 is slid away from the side plate 40, the resilient lock 30 is restored, the positioning pin 21 is removed from the through hole 31, the second cover section 20 is slid away from the first cover section 10, the first cover section 10 is slid toward the second cover section 20, and the cover plate 200 is unlocked.

The cover plate 200 further includes a plurality of lead pins 11. The plurality of lead pins 11 are fixed to two sides of the first cover section 10 and the second cover section 20. The first cover section 10 and the second cover section 20 are fixed to the chassis 100 by the lead pins 11. The corresponding lead pin 11 allows the second cover section 20 to slide away from the first cover section 10, and the corresponding lead pin 11 allows the first cover section 10 to slide toward the second cover section 20.

One end of the lead pin 11 is fixed to the first cover section 10 and the second cover section 20. Another end of the lead pin 11 is spaced a predetermined distance from the first cover section 10 and the second cover section 20.

One end of the positioning pin 21 is fixed to a side surface of the second cover section 20. Another end of the positioning pin 21 is spaced a predetermined distance from the second cover section 20 and is latched within the through hole 31.

In at least one embodiment, the positioning pin 21 is a rivet. A screw of the rivet passes through the through hole 31 and is fixed to the second cover section 20, and a nut of the rivet is latched within the through hole 31.

The resilient lock 30 is located at a junction of the first cover section 10 and the second cover section 20. The resilient lock 30 defines the through hole 31 adjacent to the second cover section 20.

The cover plate 200 further includes the lead pin 11. The lead pin 11 is fixed to two sides of the first cover section 10 and the second cover section 20. Two sides of the hard disk drawer 50 define an opening 51 for receiving the lead pins 11. The first cover section 10 and the second cover section 20 are fixed to the side plate 40 through the lead pin 11 and the opening 51.

The opening 51 is substantially L-shaped. The lead pin 11 is to be latched within one end of the opening 51 and is able to slide to be removed from another end of the opening 51.

In at least one embodiment, the lead pin 11 is a rivet. A screw of the rivet is fixed to two sides of the first cover section 10 and the second cover section 20, and a nut of the rivet is latched within an end of the opening 51.

The resilient lock 30 of the cover plate 200 is located at a junction of the first cover section 10 and the second cover section 20. When the resilient lock 30 is in a first position, the positioning pin 21 is latched within the through hole 31, one end of the first cover section 10 abuts against one end of the second cover section 20, and the cover plate 200 is locked. When the resilient lock 30 is in a second position, the positioning pin 21 is removed from the through hole 31, the first cover section 10 is slid toward the second cover section 20, and the cover plate 200 is unlocked. Thus, the resilient lock 30 of the cover plate 200 locks the second cover section 20. The first cover section 10 can be removed when the second cover section 20 is removed. Therefore, the first cover section 10 and the second cover section 20 are mutually locked together, and other components of the chassis 100 are not disturbed when removing the second cover section 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A cover plate for locking a chassis, the cover plate comprising:
    a first cover section provided on top of the chassis;
    a second cover section provided on top of the chassis and comprising a positioning pin;
    a resilient lock defining a through hole corresponding to the positioning pin;
    wherein when the resilient lock is in a first position, the positioning pin is latched in the through hole, one end of the first cover section abuts against one end of the second cover section, and the cover plate is locked; and
    wherein when the resilient lock is in a second position, the positioning pin is removed from the through hole, the first cover section is slid toward the second cover section, and the cover plate is unlocked.

2. The cover plate of claim 1, further comprising a plurality of lead pins fixed between the first cover section and the second cover section; the first cover section and the second cover section are fixed to the chassis through the lead pin.

3. The cover plate of claim 2, wherein one end of the plurality of lead pins is fixed to the first cover section and the second cover section; and the other end of the plurality of lead pins is spaced a predetermined distance from the first cover section and the second cover section.

4. The cover plate of claim 1, wherein one end of the positioning pin is fixed to a side surface of the second cover section; another end of the positioning pin is spaced a predetermined distance from the second cover section and is latched in the through hole.

5. The cover plate of claim 4, wherein the positioning pin is a rivet; a screw of the rivet is passed through the through hole and fixed to the second cover section; a nut of the rivet is latched in the through hole.

6. The cover plate of claim 1, wherein the resilient lock is located at a junction between the first cover section and the second cover section; the through hole is defined in the resilient lock adjacent to the second cover section.

7. A chassis comprising:
    a side plate;
    a cover plate fixed on the side plate and comprising a first cover section and a second cover section;
    a hard disk drawer slidably coupled to the side plate; and
    a hard disk fixed within the hard disk drawer;
    wherein the cover plate further comprises a resilient lock, a side of the second section comprises a positioning pin, the resilient lock defines a through hole corresponding to the positioning pin;
    wherein when the hard disk drawer is slid toward the side plate, the resilient lock is resiliently deformed, and the positioning pin is latched within the through hole, one end of the first cover section abuts against one end of the second cover section, and the cover plate is locked; and
    wherein when the hard disk drawer is slid away from the side plate, the resilient lock is restored, the positioning pin is removed from the through hole, the second cover section is slid away from the first cover section, the first cover section is slid toward the second cover section, and the cover plate is unlocked.

8. The chassis of claim 7, wherein the cover plate further comprises a plurality of lead pins fixed on two sides of the first cover section and the second cover section; the side plate defines openings corresponding to the lead pins; the first cover section and the second cover section are fixed to the side plate through the lead pins and the openings.

9. The chassis of claim 8, wherein the opening is L-shaped; the plurality of lead pins are latched in one end of the openings, and the lead pins are removed from the openings through another end of the openings.

10. The chassis of claim 8, wherein the plurality of lead pins are a rivets; a screw of the rivet is fixed to a side surface of the first cover section and the second cover section, and a nut of the rivet is latched in an end of the opening.

* * * * *